(12) United States Patent
Sugimoto

(10) Patent No.: US 8,027,701 B2
(45) Date of Patent: Sep. 27, 2011

(54) MOBILE PHONE FOR CHECKING THE PRESENCE OF AN INTEGRATED CIRCUIT CARD

(75) Inventor: Yoshihiro Sugimoto, Kawasaki (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 777 days.

(21) Appl. No.: 12/048,418

(22) Filed: Mar. 14, 2008

(65) Prior Publication Data

US 2008/0300018 A1 Dec. 4, 2008

(30) Foreign Application Priority Data

May 31, 2007 (JP) ................ P2007-145249

(51) Int. Cl.
*H04M 1/00* (2006.01)
(52) U.S. Cl. ............... 455/558; 379/357.05; 379/433.09
(58) Field of Classification Search .................. 455/434, 455/558; 379/357.05, 433.09
See application file for complete search history.

(56) References Cited

U.S. PATENT DOCUMENTS

| | | | |
|---|---|---|---|
| 7,007,180 B2 | 2/2006 | Hashimoto | |
| 2004/0203838 A1* | 10/2004 | Joshi et al. | 455/455 |
| 2006/0046661 A1* | 3/2006 | Ekvetchavit et al. | 455/67.11 |
| 2006/0068832 A1* | 3/2006 | Islam et al. | 455/528 |
| 2007/0218946 A1* | 9/2007 | Kim | 455/558 |

FOREIGN PATENT DOCUMENTS

| | | |
|---|---|---|
| JP | 2003-298493 | 10/2003 |
| JP | 2005-086412 | 3/2005 |
| JP | 2007-53655 A | 3/2007 |
| WO | 01/52027 A1 | 7/2001 |

OTHER PUBLICATIONS

Japanese Office Action dated Aug. 18, 2009 and English translation thereof issued in counterpart Japanese Application No. 2007-145249.
Japanese Office Action dated Aug. 2, 2011 as received in related application No. 2007-145249.

\* cited by examiner

*Primary Examiner* — Rafael Pérez-Gutiérrez
*Assistant Examiner* — Marcos Batista
(74) *Attorney, Agent, or Firm* — Maschoff Gilmore & Israelsen

(57) ABSTRACT

According to an aspect of the invention, there is provided a mobile phone including: a first timer configured to output a first time out signal representing that a first processing is to be executed by starting a system when a first given time period has elapsed; a starting unit configured to start the system; a second timer configured to determine whether time out is brought about when the system is started from a sleeping state without determining whether the time out is brought about when the system is sleeping and output a second time out signal representing that a second processing is to be executed when it is determined that a second given time period has elapsed from a time counting start time point when the system is activated; and a second processing unit configured to execute the second processing when the second time out signal is received.

5 Claims, 4 Drawing Sheets

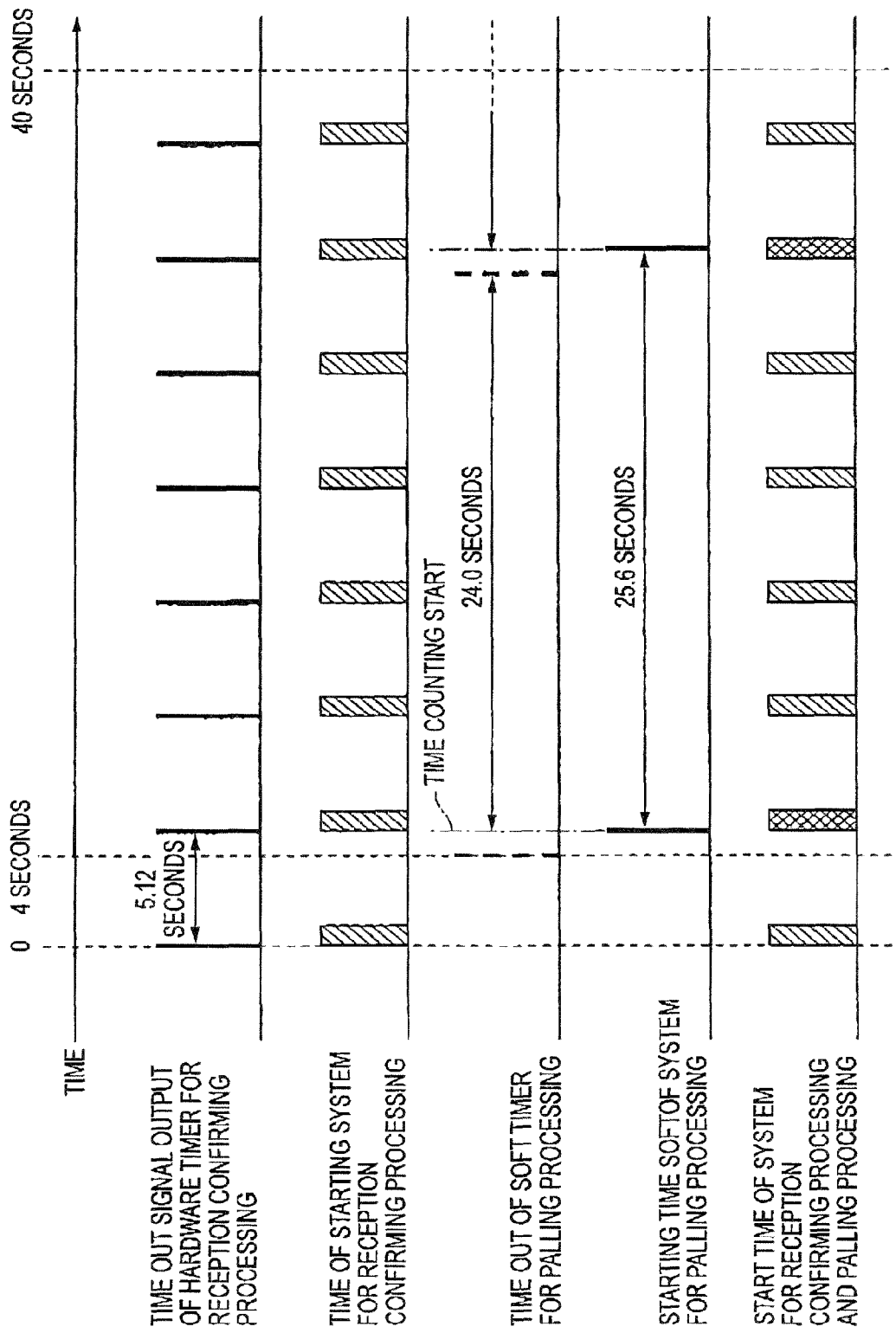

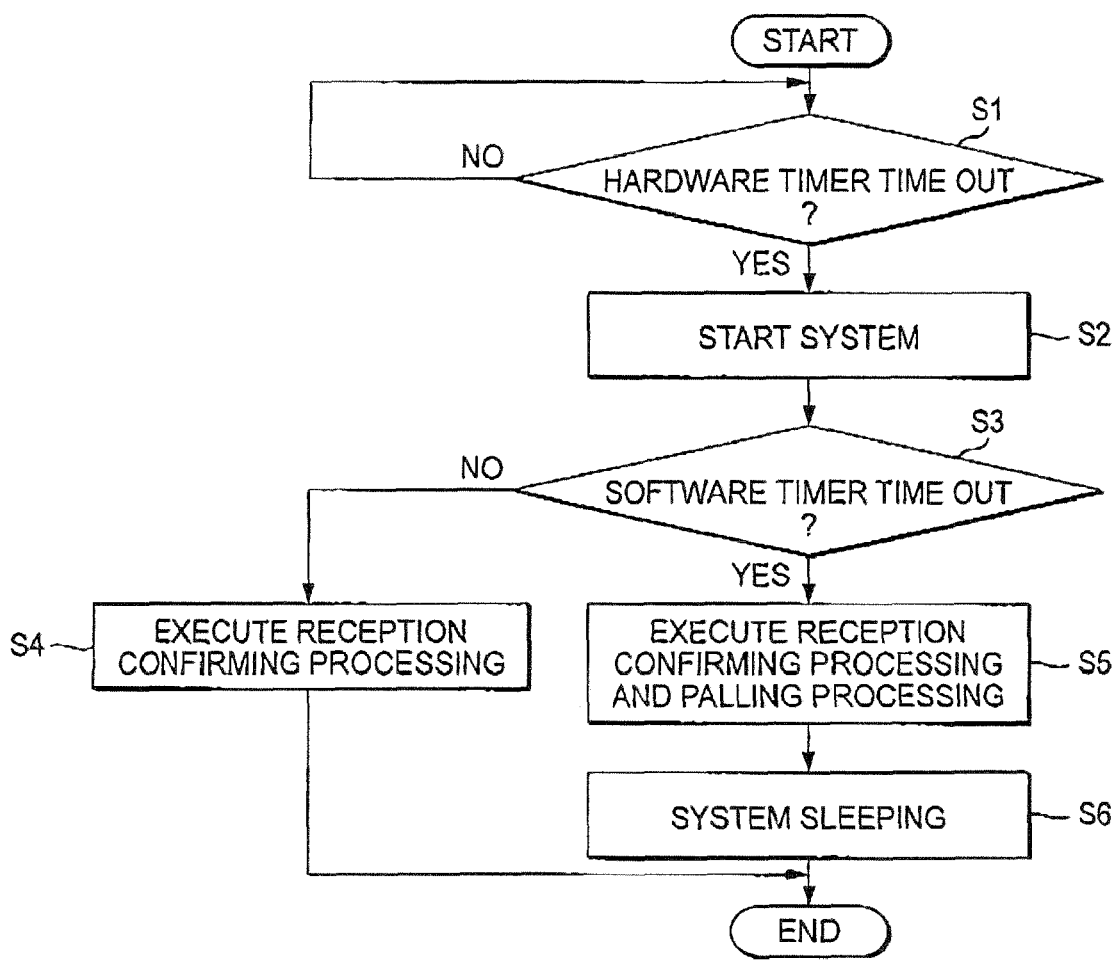

MOBILE PHONE FOR CHECKING THE PRESENCE OF AN INTEGRATED CIRCUIT CARD

CROSS-REFERENCE TO RELATED APPLICATIONS

This application is based on and claims the benefit of priority from the prior Japanese Patent Application No. 2007-145249, filed on May 31, 2007; the entire contents of which are incorporated herein by reference.

BACKGROUND

1. Technical Field

The present invention relates to a mobile phone for utilizing a data of an IC card of a UIM card or the like.

2. Description of Related Art

There is a mobile phone inserting an IC card of a UIM (User Identity Module) card or an SIN (Subscriber Identity Module) card or the like (hereinafter, refer to as UIM card) and utilizing a data stored to the card. The UIM card is stored with various kinds of personal information starting from an inherent ID No for specifying a telephone number (refer to, for example, JP-A-2007-53655). Therefore, it is necessary to monitor which (JIM card is currently inserted to a mobile phone from a view point of protecting personal information.

In the related-art technique, according to a mobile phone of this kind, a polling processing of the UIM card is carried out in starting a system (in speaking or in data communicating), or in system sleeping (at standby). Here, the polling processing of the UIM card refers to confirming whether the UIM card is inserted, whether the URI card is not interchanged or the like.

By carrying out the polling processing of the UIM card periodically and repeatedly, it can pertinently be monitored which OIM card is currently inserted to a mobile phone.

SUMMARY

According to the polling processing technology of the UIM card of the related-art technique, it is necessary to start the system only for executing the polling processing when the system of the mobile phone is sleeping. Large power consumption is needed for starting the system for the polling processing. Therefore, power consumption in accordance with the polling processing in system sleeping constitutes one of large factors of reducing a battery remaining amount of the mobile phone.

According to an aspect of the invention, there is provided a mobile phone including: a first timer configured to output a first time out signal representing that a first processing is to be executed by starting a system each time when a first given time period has elapsed; a starting unit configured to start the system when the first time out signal is received; a first processing unit configured to execute the first processing when the first time out signal is received and the system is started; a second timer configured to determine whether time out is brought about when the system is started from a sleeping state without determining whether the time out is brought about when the system is sleeping and output a second time out signal representing that a second processing is to be executed when it is determined that a second given time period has elapsed from a time counting start time point when the system is activated; and a second processing unit configured to execute the second processing when the second time out signal is received.

BRIEF DESCRIPTION OF THE DRAWINGS

FIG. 3 is an explanatory view showing an example when a timing of executing a polling processing is synchronized with a timing of executing a reception confirming processing by executing the polling processing by utilizing a time out output of a software timer; and FIG. 4 is a flowchart showing a procedure when an influence of a polling processing of a DIM card in system sleeping effected on a battery remaining amount is restrained by executing the polling processing by utilizing a time out output of a software timer by CPU of the mobile phone shown in FIG. 1.

DESCRIPTION OF THE EMBODIMENTS

Figure 1:
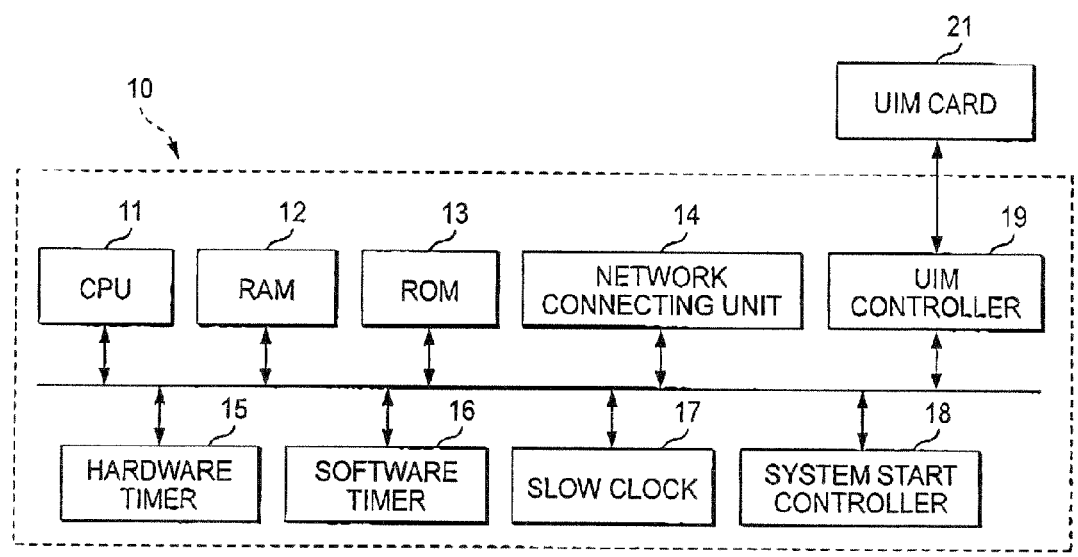
FIG. 1 is an exemplary overview showing a mobile phone according to an embodiment of the invention.

Embodiments of the invention will be explained in reference to the attached drawings. FIG. 1 is overview showing a mobile phone 10 according to an embodiment of the invention. Further, according to the embodiment, as an example of the mobile phone 10, an explanation will be given of the mobile phone 10 utilizing an IC card stored with personal information of a telephone number or the like. Further, according to the embodiment, an explanation will be given of a case of utilizing a UIM card 21 as an example of the IC card. Further, according to the embodiment, a state in which a system of the mobile phone 10 is sleeping is made to constitute a standard state The mobile phone 10 includes CPU 11, RAM 12, ROM 13, a network connecting unit 14, a hardware timer 15 serving as a first timer, a software timer 16 serving as a second timer, a slow clock 17, a system controller 18, and a UIM controller 19.

CPU 11 controls a processing operation of the mobile phone 10 in accordance with a program stored in ROM 13. CPU 11 loads a power consumption restraining program stored in ROM 13 and a data for executing the program to RAM 12 and executes a processing of restraining an influence of a polling processing of the UIM card 21 in system sleeping effected on a battery remaining amount in accordance with the power consumption. restraining program.

CPU 11 functions at /east as a reception confirming processing unit, a polling processing unit by the power consumption restraining program. The respective units utilize a given work area of RAM 12 as a location of temporarily storing the data. Further, the function realizing unit may be constituted by a hardware logic of a circuit or the like without using CPU 11.

The reception confirming processing unit receives a time out signal from the hardware timer 15, confirms signal reception of whether there is an arrival signal to a base station immediately after starting a system, confirms signal reception whether there is not a mail reception signal, and executes a synchronizing processing or the like. The signal reception is confirmed for receiving the arrival signal to the mobile phone 10 without delay, to receive the mail reception signal without delay or the like.

The polling processing unit receives a time out signal from the software timer 16 and executes a processing of confirming information of whether at /east the VIM card 21 is inserted and whether the UTM card 21 is interchanged by the VIM controller 19. According to the embodiment, the polling processing of the UTM card 21 (hereinafter, referred to as polling processing) refers to confirming whether the UIM card 21 is inserted, whether the VIM card 21 is interchanged or the like. Further, the system is started when the time out signal of the software tinier 16 is outputted.

RAM 12 provides a given work area for temporarily storing a program executed by CPU 11 and a data.

ROM 13 is stored with a program of starting the mobile phone 101 the power consumption restraining program and various kinds of data for executing the programs. Further, RAM 13 may be configured by a record medium readable by CPU 11 of a magnetic or an optical record medium, a semiconductor memory or the like, and may be configured by a unit or a total of a program and a data at inside of ROM 13 which are downloaded by an electronic network.

The network connecting unit 14 is mounted with various protocols for communicating information in accordance with a mode of a network. The network connecting unit 14 connects the mobile phone 10 to the electronic network in accordance with the various kinds of protocols. Here, the electronic network signifies a general information communicating network utilizing an electric communication technology and includes a telephone communication network as well as a wireless/wired LAN (Local Area Network), the internet network or the like.

The hardware timer 15, serving as the first timer, outputs the time out signal to the reception confirming processing unit and the system controller 18 at each time of an elapse of a first given time period (time out). The hardware timer 15 can receives an output of the slow clock 17 continuing to count time even in system sleeping. Therefore, the hardware timer 15 can detect out of time and output a time out signal immediately even when the system is sleeping at time out. time. The hardware timer 15 forcibly starts the system in sleeping at time out time by providing the time out signal to the system controller 18.

According to the embodiment, an explanation will be given of a case in which the first given time is 5.12 seconds constituting a period of a general signal receiving operation (reception confirming processing) of the mobile phone The software timer 16 constituting the second timer outputs a time out signal to the polling processing unit at each time of an elapse of a second given time (time out). The software timer 16 is rigidly one of softwares of the system, and therefore, operation thereof is stopped in system sleeping. Therefore, when the system is sleeping at real time out, the time out cannot be detected thereby When the system is shifted from a sleeping state to a starting state, the software timer 16 calculates an elapsed time period in sleeping from a first register of the slow clock 17 immediately after starting the system, adds the elapsed time period to an elapsed time period before system sleeping and determines whether time out is received in system sleeping. That is, the software timer 16 immediately outputs a second time out signal when the system is starting at a time point of an elapse of the second given time from a starting time point, outputs the second time out signal immediately after starting the system at a next time when the system is sleeping and starts counting time again.

The system controller 18 receives the time out signal from the hardware timer 15 and starts the system.

Figure 2:
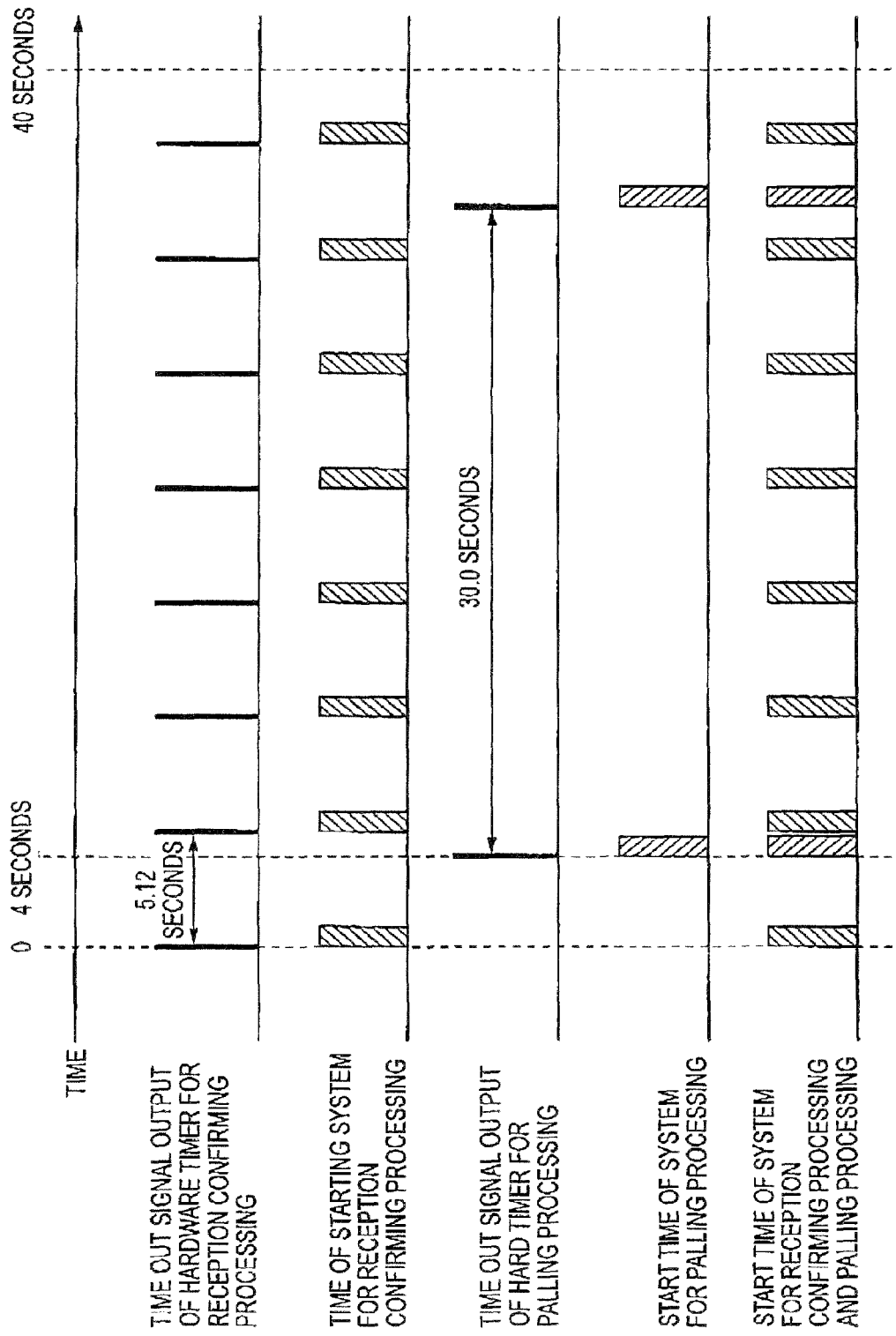
FIG. 2 is an explanatory view showing an example when a reception confirming processing and a polling processing of a UIM card are executed by utilizing a time out output of a hardware timer.

Next, an example of an operation of the mobile phone 10 according to the embodiment will be explained. FIG. 2 is an explanatory view showing an example of a case of executing the reception confirming processing and the polling processing of the IJIM card 21 of the related-art technique by utilizing the time out output of the hardware timer 15.

Assume that it is necessary to execute the polling processing of the DIM card 21 by, for example, once within 30 seconds in system sleeping. Then, in order to reduce power consumption maximally, it is conceivable to constitute a time out signal output period for the polling processing by 30 seconds and execute the polling processing by receiving the time out signal.

FIG. 2 generally shows system starting time of 40 seconds when the time out period for reception confirming processing is constituted by 5.12 seconds, and a time out period for the polling processing is constituted by 30 seconds and when a time original point is constituted by outputting a certain time out signal for confirming reception and the time out signal for the polling processing is outputted after 4 seconds therefrom.

As shown by FIG. 2, the reception confirming processing and the polling processing are not synchronized with each other. Therefore, at each time of outputting the time out signal by which the respective processings are to be executed, the system controller 18 starts the system and the respective processings are executed. In the example shown in FIG. 2, a total of 10 times of system starting is carried out during 40 seconds.

When a timing of executing the polling processing can be synchronized with a timing of executing the reception confirming processing, it can be avoided to start the system with an object of only executing the polling processing and power consumption at standby can considerably be reduced.

FIG. 3 is an explanatory view showing an example when the timing of executing the polling processing is synchronized with the timing of executing the reception confirming processing by executing the polling processing by utilizing the time out output of the software timer 16.

When the polling processing is synchronized with the reception confirming processing, the period of the polling processing becomes the period of the reception confirming processing multiplied by a natural number. When the period of the reception confirming processing is 5.12 seconds, a longest period within 30 seconds is 512×525.6 seconds. The software timer 16 outputs the time out signal in starting the system at next time when time out is received in system sleeping. Therefore, in order to execute the palling polling processing by the period of 25.6 seconds, it is preferable that the time out period of the software-timer 16 is set to a time period longer than a time period constituted by adding a system starting time period required for the reception confirming processing to 5.12×4−20 48 seconds and shorter than 25.6 seconds. FIG. 3 shows an example of a case in which the time out period of the software timer 16 for the polling processing is constituted by 24 seconds.

Further, in order to prevent an erroneous operation, a lower limit of the time out period of the software timer 16 may be set to be equal to or longer than 23.04 seconds constituted by reducing 2.56 seconds of a half of 5.12 seconds from 25.6 seconds in consideration of the system starting time period required for the reception confirming processing. Further, also with regard to an upper limit, in consideration of an error, it is preferable to execute time out a little earlier than 25.6 seconds (for example, 24 seconds or the like).

As shown by FIG. 3, the timings of executing the reception confirming processing and the polling processing can be synchronized with each other by executing the polling processing by utilizing the time out output of the software timer 16. Whereas a given number of times of starting the system during 40 seconds has been 10 times in the example shown in FIG. 2, in the example shown in FIG. 3, the number is constituted by 8 times. Therefore, by executing the polling processing by utilizing the time out output of the software timer 16, an influence of the polling processing of the UIM card 21 effected on the battery remaining amount during the system sleeping can be restrained.

FIG. 4 is a flowchart showing a procedure when the influence of the polling processing of the UIM card 21 effected on the battery remaining amount in system sleeping is restrained by executing the polling processing by utilizing the time out output of the software timer 16 by CPU 11 of the mobile phone 10 shown in FIG. 1. In FIG. 4, notations attaching numerals to S designate respective steps of the flowchart.

Further, in the procedure, an explanation will be given by constituting the standard state by the state in which the system of the mobile phone 10 is sleeping. First, at step Si, it is determined whether the hardware timer 15 is brought into time out. When the hardware timer 15 is brought into time out, the time out signal (first time out signal) is outputted to the system controller 18 and the reception confirming processing unit and the operation proceeds to step 52. On the other hand, when the hardware timer 15 is not brought into time out, it is successively monitored whether the hardware timer 15 is brought into time out.

Next, at step S2, the system controller 18 starts the system by receiving the time out signal from the hardware timer 15.

Next, at step 53, it is determined whether the software timer 16 is brought into time out immediately after starting the system. When the software timer 16 is brought into time out, the time out signal is outputted to the polling processing unit, and the operation proceeds to step S9. On the other hand, when the software timer 16 is not brought into time out, the operation proceeds to step S5.

Next, at step S4, the reception confirming processing unit confirms signal reception to the base station in order to receive, for example, an arrival signal to the mobile phone 10 without delay. Further, as processings of the reception confirming processing unit, there may executed not only confirming the arrival signal but also one processing or a plurality of processings of an arrival signal processing, other synchronizing processing, and a mail reception confirming processing.

On the other hand, when the software timer 16 outputs the time out signal, at step S5, the reception confirming processing unit confirms signal reception to the base station in order to receive the arrival signal to the mobile phone 10 without delay and the polling processing unit executes a processing of confirming information of at least whether the UIM card 21 is inserted and. whether the UIM card 21 is interchanged by receiving the time out signal from the software timer 16 (polling processing). As processings of the reception confirming processing unit, similar to step S4, there may be carried out not only confirming the time out signal but also one processing or a plurality of processings of the arrival signal processing, other synchronizing processing, and the mail reception confirming processing.

Further, although at step S5, when as a result of the polling processing, it is determined that the UIM card 21 is inserted and when it is determined that the vim card 21 is not interchanged, an operation may proceed to step S6 as they are, when it is determined that the UIM card 21 is not inserted or when it is determined that the UIM card 21 is interchanged, it is preferable that it is determined that an abnormal state (there is possibility of illegal use) is brought about, the operation does not proceed to step 56, and a power source is forcibly made OFF.

Further, at step S6, CPU 11 confirms that all the processings have been finished to bring the system into the sleeping state again (the flow from step Si is repeated again during a time period in which the system is sleeping).

Further, other than the processing of the reception confirming processing unit for processing by constituting time out at each 5.12 seconds, the hardware timer 15 may be set to further constitute time out at other timing to execute other processing. In that case, in the determination of whether the hardware timer 15 is brought into time out at step Si, it is determined whether the hardware timer 15 is brought into time out also in consideration of the time out other than the time out at each 5.12 seconds.

Further, when it is determined that the software timer 16 is brought into time out at step 53, time counting is started at the software timer 16 again.

By executing the polling processing by utilizing the time out output of the software timer 16 by the above-described procedure, the influence of the polling processing effected on the battery remaining amount during system sleeping can be restrained.

The mobile phone 10 according to the embodiment executes the polling processing by utilizing the time out output of the software timer 16. Therefore, the timings of executing other processing of the reception confirming processing for outputting time out of the hardware timer 15 or the like and the polling processing can easily be synchronized with each other.

Therefore, according to the mobile phone 10 according to the embodiment, the system can be prevented from being started only for the polling processing and the influence of the polling processing effected on the battery remaining amount can be restrained.

Further, in the mobile phone, substantially most of time is standby time. According to the embodiment, an increase in consumption of a current at standby time can be restrained, and therefore, power consumption can considerably be reduced.

Therefore, standby time can further be prolonged and an availability of a user can be promoted.

Further, the invention is not limited to the embodiment as it is but can be modified to specify a constituent element within the range not deviated from the gist at an embodying stage. Further, various inventions can be formed by pertinently combining a plurality of constituent elements disclosed in the embodiment. For example, a number of constituent elements can be eliminated from all the constituent elements shown in the embodiment.

According to the above-mentioned embodiments, an influence of a polling processing of a UIM card in system sleeping effected on a battery remaining amount can be restrained.

Further, although the flowchart shown in FIG. 4 shows an example of a case in which the processings of respective steps are executed time-sequentially in accordance with a described order, the flowchart may not necessarily be processed time-sequentially or maybe executed in parallel or individually.

What is claimed is:

1. A mobile phone comprising:
   a first timer configured to output a first time out signal representing that a first processing is to be executed by running a system each time when a first given time period has elapsed;
   a starting controller configured to run the system if the first time out signal is received;
   a first processing unit configured to execute the first processing if the first time out signal is received and if the system is run;
   a second timer configured, when the system is run and if it is determined that a second given time period has elapsed from a time counting start time, to output a second time out signal representing that a second processing of confirming information as to whether an IC card is inserted or interchanged is to be executed, and when the system is shifted from a sleeping state to a starting state, the second timer calculates a time period elapsed from the time counting start time, during the sleeping state, to the starting state and determines whether time out has occurred, and a polling processing unit configured to execute the second processing if the second time out signal is received.

2. The mobile phone according to claim 1 wherein the second timer outputs the second time out signal and starts the time counting again.

3. The mobile phone according to claim 1, wherein the first processing unit confirms a signal reception to a base station.

4. The mobile phone according to claim 1, wherein the polling processing unit makes a power source of the mobile phone OFF when it is determined that the IC card is not inserted or interchanged.

5. The mobile phone according to claim 1, wherein the first given time period is 5.12 seconds.

* * * * *